(12) United States Patent
Weisbruch

(10) Patent No.: US 11,312,433 B2
(45) Date of Patent: Apr. 26, 2022

(54) SEALING SYSTEM FOR A TRACK

(71) Applicant: Caterpillar Inc., Deerfield, IL (US)

(72) Inventor: Eric Bernard Weisbruch, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 492 days.

(21) Appl. No.: 16/254,769

(22) Filed: Jan. 23, 2019

(65) Prior Publication Data

US 2020/0231229 A1 Jul. 23, 2020

(51) Int. Cl.
*B62D 55/088* (2006.01)
*B62D 55/21* (2006.01)

(52) U.S. Cl.
CPC ......... *B62D 55/0887* (2013.01); *B62D 55/21* (2013.01)

(58) Field of Classification Search
CPC .............. B62D 55/088; B62D 55/0887; B62D 55/092; B62D 55/205; B62D 55/21
See application file for complete search history.

(56) References Cited

U.S. PATENT DOCUMENTS

| | | | |
|---|---|---|---|
| 5,069,509 A | 12/1991 | Johnson et al. | |
| 6,206,491 B1 * | 3/2001 | Hisamatsu | B62D 55/088 305/103 |
| 7,850,256 B2 * | 12/2010 | Mulligan | B62D 55/21 305/104 |
| 9,457,852 B2 * | 10/2016 | Johannsen | B62D 55/0887 |
| 2015/0061369 A1 | 3/2015 | Thorson | |
| 2017/0158269 A1 | 6/2017 | Marchione | |

FOREIGN PATENT DOCUMENTS

WO WO-2008037009 A1 * 4/2008 ............. F16H 57/04

* cited by examiner

*Primary Examiner* — Kip T Kotter
*Assistant Examiner* — Emily G Castonguay
(74) *Attorney, Agent, or Firm* — Law Office of Kurt J. Fugman LLC

(57) ABSTRACT

A track hinge joint includes a first track link, a second track link, a track pin disposed in a bore of the first track link, an inner bushing that is disposed in a bore of the second track link and that is rotatable relative to the track pin, an outer bushing that is disposed about the inner bushing that is rotatable relative to the inner bushing and that includes an outer bushing end face, and a first fluid seal assembly contacting the outer bushing end face and the second track link.

18 Claims, 4 Drawing Sheets

SEALING SYSTEM FOR A TRACK

TECHNICAL FIELD

The present disclosure relates to a method and apparatus for a sealing system used in a track chain assembly of an endless undercarriage drive employed by earth moving, construction and mining equipment and the like. Specifically, the present disclosure relates to a sealing system for use with such a track chain assembly that reduces the wear of a bushing while still allowing lubricant to be sealed in the track chain assembly.

BACKGROUND

Earth moving, construction and mining equipment and the like are often used in rough, off-road terrain. These machines often employ an endless drive with track shoes that is better able to propel the machines in such environments over obstacles and uneven terrain, etc.

As can be imagined, there can be a great deal of tension and loads on the track chain. As machines become heavier and increase in horsepower, undercarriage link assemblies of the track chain are susceptible to even greater risk of component fatigue and wear. Eventually, the machine and track will need to be serviced, resulting in loss profits.

More specifically, the load exerted on the bushings and track pins of the track chain by the sprocket may cause these components, especially the bushing to become worn or fatigued. For example, the drive sprocket may contact the bushings of the track chain and friction created between the drive sprocket and the bushing may create wear. Or, the seals associated with the bearings and track links for holding lubricant near areas of friction may become damage, allowing the lubricant to leak out. This may lead to wear problems for the moving components of the track chain.

Prior track chains are directed to various performances. For example, U.S. Pat. No. 5,069,509 is commonly owned by the assignee of the present disclosure. The '509 patent is directed to an endless track chain with a rotatable sleeve that is mounted about an inner track bushing to provide the track with longer external bushing life. The rotatable sleeve is sealed and lubricated, as is the standard track joint. However, the rotatable sleeve only has a dust seal at the interface between the inner track link and the rotatable sleeve. Hence, lubrication between the rotatable sleeve and the inner track bushing is limited, leading to wear and eventually needed maintenance.

Accordingly, it is desirable that a track chain assembly that is less prone to maintenance be developed.

SUMMARY

A track hinge joint according to an embodiment of the present disclosure may comprise a first track link including a first body defining a top surface, a bottom surface, a first side surface and a second side surface defining a thickness therebetween, a proximate end and a distal end, and a length therebetween. The first body also defines a first bore with a first diameter disposed adjacent the proximate end and a second bore with a second diameter disposed adjacent the distal end, the first diameter being smaller than the second diameter. The track hinge joint further comprises a second track link including a second body defining a top surface, a bottom surface, a first side surface and a second side surface defining a thickness therebetween, a proximate end and a distal end, and a length therebetween. The second body may define a third bore with a third diameter disposed adjacent the proximate end and a fourth bore with a fourth diameter disposed adjacent the distal end, the third diameter being larger than the fourth diameter. The third bore may be aligned with the first bore, defining a common track link bore longitudinal axis. The track hinge joint may further comprise a track pin disposed in the second bore, an inner bushing that is disposed in the third bore that is rotatable relative to the track pin, an outer bushing that is disposed about the inner bushing that is rotatable relative to the inner bushing, wherein the outer bushing defines an outer bushing end face disposed along the track link bore longitudinal axis proximate the second track link, and a first fluid seal assembly contacting the outer bushing end face and the second track link.

A track hinge joint according to an embodiment of the present disclosure is provided. The track hinge joint may comprise a first track link including a first body defining a top surface, a bottom surface, a first side surface and a second side surface defining a thickness therebetween, a proximate end and a distal end, and a length therebetween. The first body may define a first bore with a first diameter disposed adjacent the proximate end and a second bore with a second diameter disposed adjacent the distal end, the first diameter being larger than the second diameter. The track hinge joint may further comprise a second track link including a second body defining a top surface, a bottom surface, a first side surface and a second side surface defining a thickness therebetween, a proximate end and a distal end, and a length therebetween. The second body may define a third bore with a third diameter disposed adjacent the proximate end and a fourth bore with a fourth diameter disposed adjacent the distal end, the third diameter being larger than the fourth diameter. The third bore may be aligned with the second bore, defining a common track link bore longitudinal axis. The track hinge joint may further comprise a track pin disposed in the second bore, an inner bushing that is disposed in the third bore that is rotatable relative to the track pin, an outer bushing that is disposed about the inner bushing that is rotatable relative to the inner bushing, wherein the inner bushing includes a cylindrical annular configuration defining a first central thru-hole that defines an inner bushing inner diameter, the track pin includes a cylindrical configuration that defines a track pin outer diameter, and a ratio of the inner bushing inner diameter to the track pin outer diameter ranges from 1.00 to 1.02.

A track chain assembly according to an embodiment of the present disclosure is provided. Each track hinge joint may comprise a first track link including a first body defining a top surface, a bottom surface, a first side surface and a second side surface defining a thickness therebetween, a proximate end and a distal end, and a length therebetween. The first body also defines a first bore with a first diameter disposed adjacent the proximate end and a second bore with a second diameter disposed adjacent the distal end, the first diameter being smaller than the second diameter. The assembly further comprises a second track link including a second body defining a top surface, a bottom surface, a first side surface and a second side surface defining a thickness therebetween, a proximate end and a distal end, and a length therebetween. The second body may define a third bore with a third diameter disposed adjacent the proximate end and a fourth bore with a fourth diameter disposed adjacent the distal end, the third diameter being larger than the fourth diameter. The third bore may be aligned with the first bore, defining a common track link bore longitudinal axis. The track hinge joint may further comprise a track pin disposed in the second bore, an inner bushing that is disposed in the third bore that is rotatable relative to the track pin, an outer bushing that is disposed about the inner bushing that is rotatable relative to the inner bushing, wherein the outer bushing defines an outer bushing end face disposed along the track link bore longitudinal axis proximate the second track link, and a first fluid seal assembly contacting the outer bushing end face and the second track link.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings.

DETAILED DESCRIPTION

Figure 1:
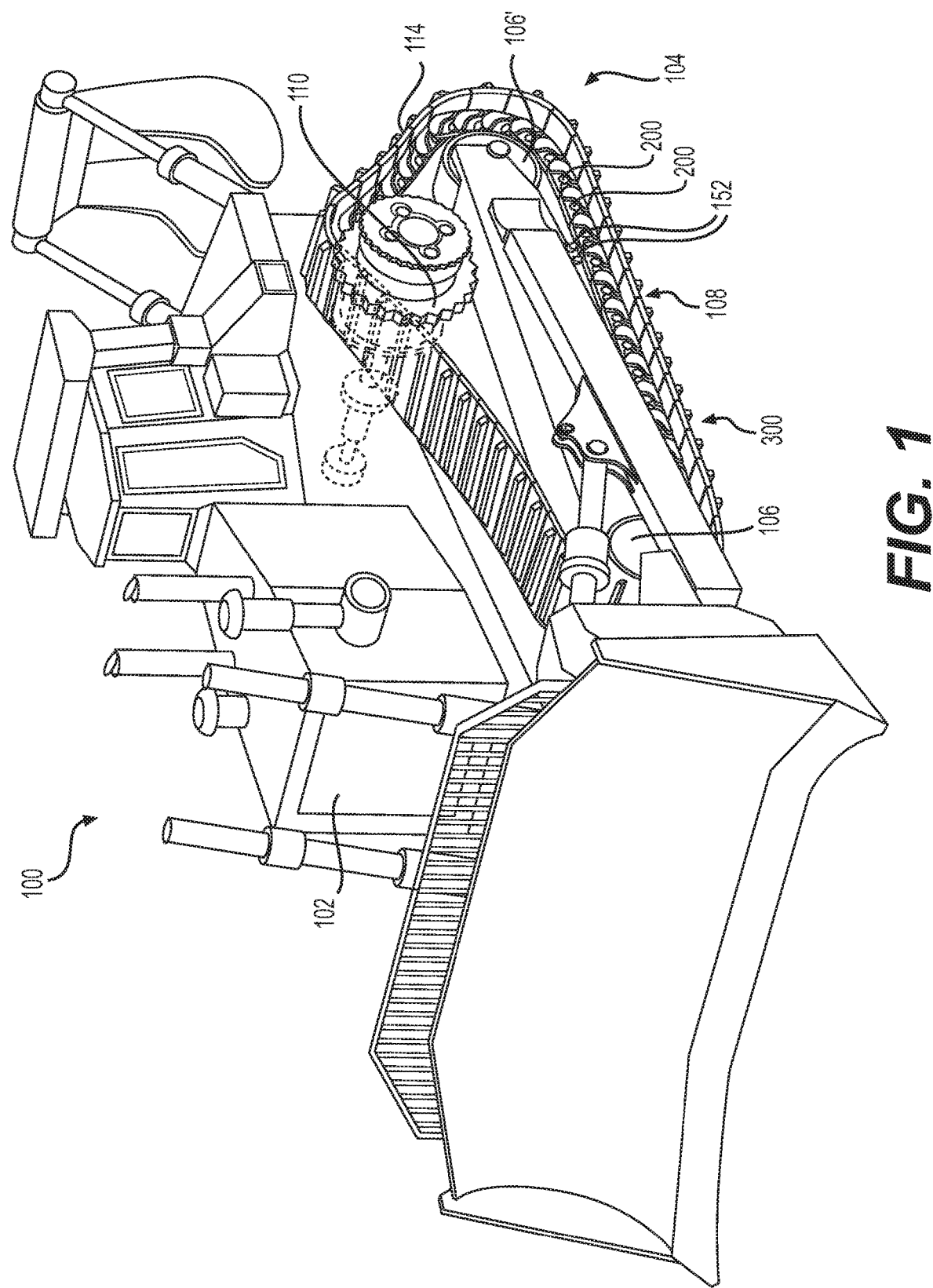
FIG. 1 is a perspective of a machine that may use various track chain assemblies with a sealing system according to various embodiments of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or by a prime for example, 100', 100" etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

Various embodiments of a track hinge joint and a track chain assembly with a sealing system according to an embodiment of the present disclosure will now be described. These various embodiments may reduce the likelihood that the track chain assembly will need to be replaced. That is to say, various track chain assemblies as described herein may be robust since the outer bushing is rotatable and a fluid seal assembly helps to prevent the loss of lubricant.

FIG. 1 illustrates an exemplary machine 100 having multiple systems and components that cooperate to accomplish a task. Machine 100 may embody a mobile machine that performs some type of operation associated with an industry such as mining, construction, farming, transportation, or any other industry known in the art. For example, machine 100 may be an earth moving machine such as an excavator, a dozer, a loader, a backhoe, a motor grader, or any other earth moving machine. Machine 100 may include a power source 102 and an undercarriage assembly 104, which may be driven by power source 102 and supported by one or more spaced-apart idler wheels 106.

Power source 102 may drive undercarriage assembly 104 of machine 100 at a range of output speeds and torques. Power source 102 may be an engine such as, for example, a diesel engine, a gasoline engine, a gaseous fuel-powered engine, or any other suitable engine. Power source 102 may also be a non-combustion source of power such as, for example, a fuel cell, a power storage device, or any other source of power known or that will be devised in the art.

Undercarriage assembly 104 may include two separate continuous tracks 108, one on either side of machine 100 (only one of which is shown in FIG. 1). Each track 108 may be driven by power source 102 via one or more drive sprockets 110. In addition, each track 108 may include a track chain assembly 300 and a plurality of track shoes 114, each configured to selectively engage a surface, e.g., the ground. Each track chain assembly 300 may include a plurality of track hinge joints 200 each having an outer bushing that is rotatable and a sealing system that prevents the leakage of fluid from the space located between the inner track links and the outer bushing. Support rollers 152 are also provided at the bottom of the track to support the track chain assembly 300.

Figure 2:
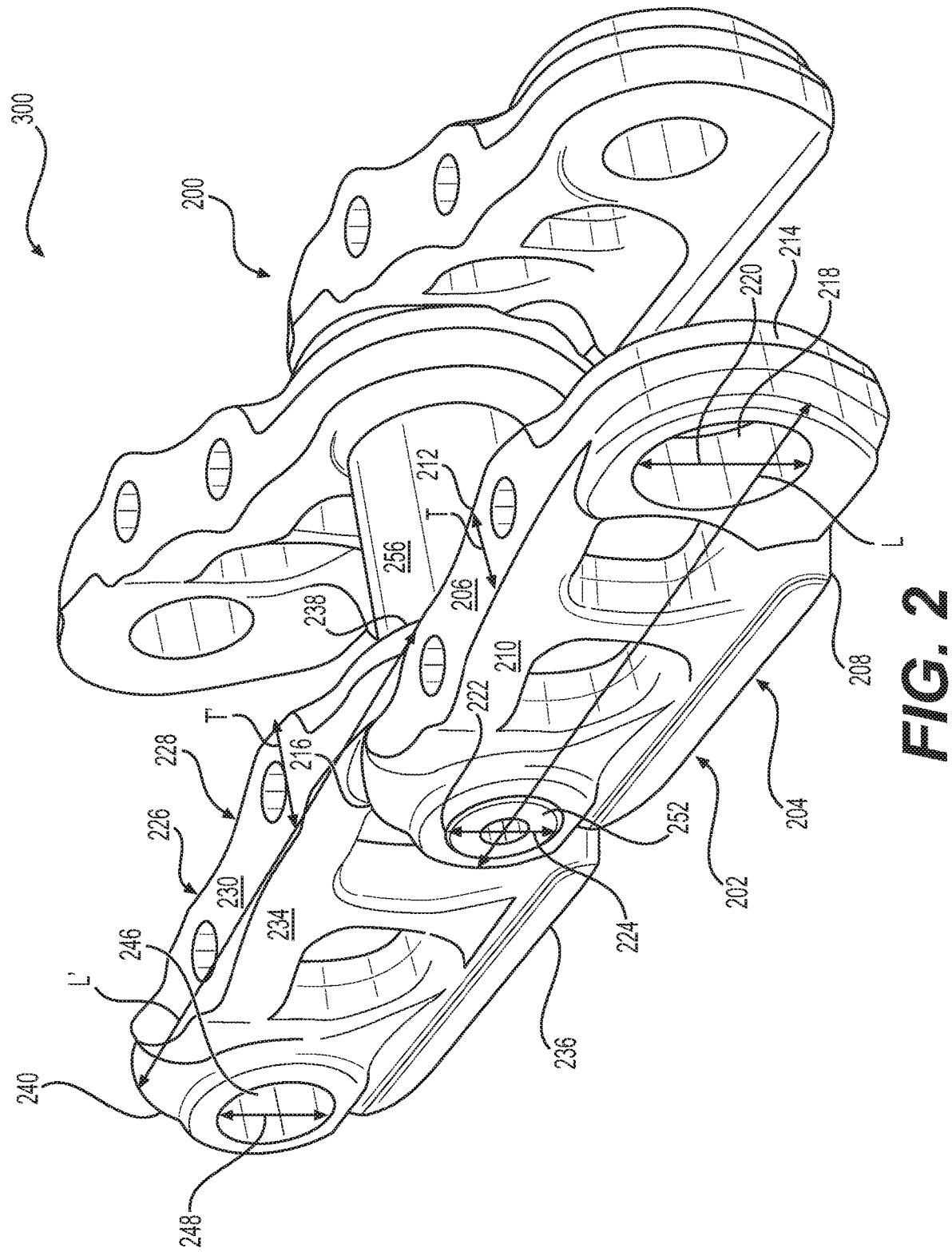
FIG. 2 is a perspective view of a track chain assembly with a sealing system according to an embodiment of the present disclosure shown in isolation from the machine of FIG. 1.
Figure 3:
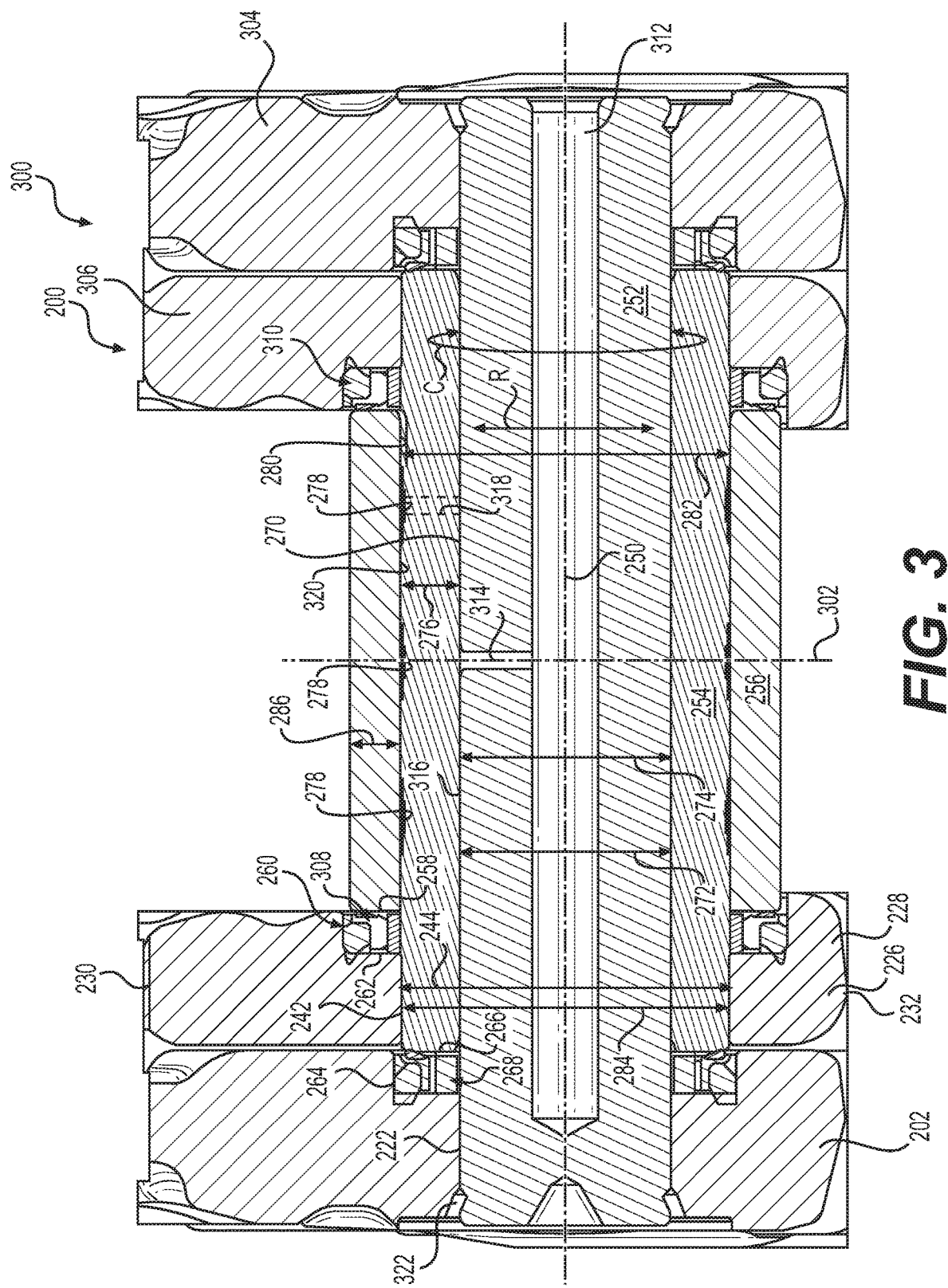
FIG. 3 is a sectional view of the track chain assembly taken along a plane containing the longitudinal axis of the track pin and the inner bushing and outer bushings of FIG. 2.
Figure 4:
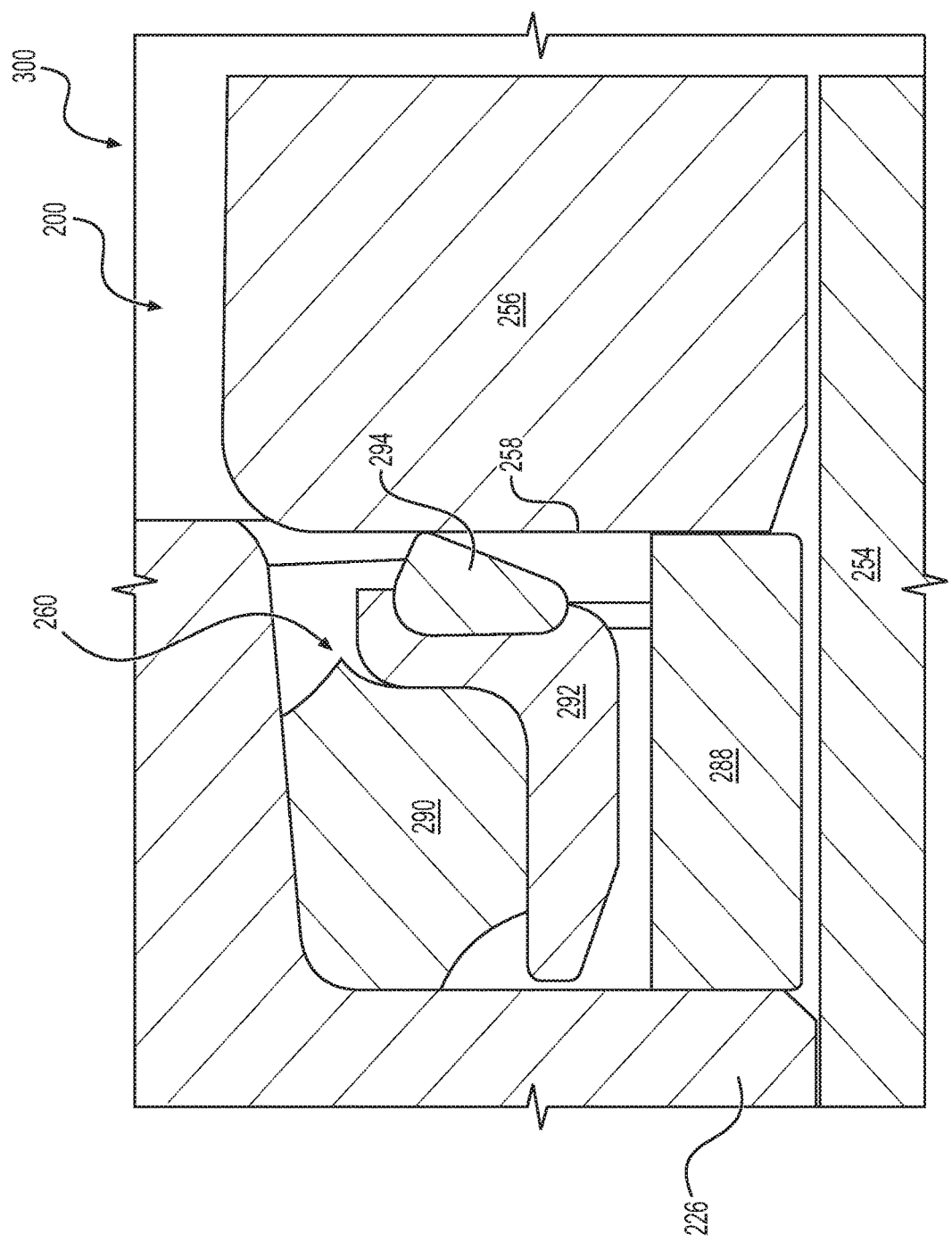
FIG. 4 is an enlarged view of a portion of FIG. 3 illustrating the seal assembly disposed between an inner link and the end face of the outer bushing.

Referring now to FIGS. 2 thru 4, a track chain assembly 300 that may use track hinge joints 200 according to various embodiments of the present disclosure will be described. Starting with FIG. 2, each track hinge joint 200 may comprise a first track link 202 including a first body 204 defining a top surface 206, a bottom surface 208, a first side surface 210 and a second side surface 212 defining a thickness T therebetween, a proximate end 214 and a distal end 216, and a length L therebetween. The first body 204 also defines a first bore 218 with a first diameter 220 disposed adjacent the proximate end 214 and a second bore 222 with a second diameter 224 disposed adjacent the distal end 216. The first diameter 220 may be larger than the second diameter 224 as shown but not necessarily so.

Similarly, referring now to FIGS. 2 and 3, a second track link 226 may be provided including a second body 228 defining a top surface 230, a bottom surface 232, a first side surface 234 and a second side surface 236 defining a thickness T' therebetween, a proximate end 238 and a distal end 240 and a length L' therebetween. The second body 228 defines a third bore 242 with a third diameter 244 disposed adjacent the proximate end 238 and a fourth bore 246 with a fourth diameter 248 disposed adjacent the distal end 240. The third diameter 244 may be larger than the fourth diameter 248 as shown but not necessarily so.

As best seen in FIG. 3, the third bore 242 is aligned with the second bore 222 when the track hinge joint 200 is assembled. Thus, the first bore 218 and the second bore 222 may define a common track link bore longitudinal axis 250.

As shown in FIGS. 2 and 3, the first track link 202 and the second track link 226 may be similarly or identically configured but not necessarily so. Also, the first track link 202 and the second track link 226 are shown to be offset links since their bodies 204, 228 jog axially. In other embodiments, the first and second track links 202, 226 may be straight links, etc.

Focusing on FIG. 3, the track hinge joint 200 may further include a track pin 252 disposed in the second bore 222, an inner bushing 254 that is disposed in the third bore 242 that is rotatable relative to the track pin 252, and an outer bushing 256 that is disposed about the inner bushing 254 that is rotatable relative to the inner bushing 254. The outer bushing 256 may define an outer bushing end face 258 disposed along the track link bore longitudinal axis 250 proximate the second track link 226. The track hinge joint 200 may further include a first fluid seal assembly 260 contacting the outer bushing end face 258 and the second track link 226.

More specifically, the second track link 226 may define an outer seal groove 262 that is concentric about the track link bore longitudinal axis 250. The first fluid seal assembly 260 may be disposed in the outer seal groove 262.

Referring to FIG. 3, the inner bushing 254 may be press fit into the third bore 242 of the second track link 226 such that the inner bushing 254 is fixed relative to the second track link 226. In addition, the track pin 252 may be press fit into the second bore 222 of the first track link 202 such that the track pin 252 is fixed relative to the first track link 202.

Moreover, the first track link 202 may define an inner seal groove 264 concentric about the track link bore longitudinal axis 250, and the inner bushing 254 may define an inner bushing end face 266 disposed along the track link bore longitudinal axis 250. A second fluid seal assembly 268 may be disposed in the inner seal groove 264 and may contact the inner bushing end face 266.

With continued reference to FIG. 3, the inner bushing 254 may include a cylindrical annular configuration defining a first central thru-hole 270 that defines an inner bushing inner diameter 272. Likewise, the track pin 252 may include a cylindrical configuration that defines a track pin outer diameter 274, and a ratio of the inner bushing inner diameter 272 to the track pin outer diameter 274 may range from 1.00 to 1.02.

Furthermore, the inner bushing 254 may define a radial direction R, a circumferential direction C, and an inner bushing radial thickness 276 ranging from 12.83 mm to 12.84 mm. Also, the inner bushing 254 may further define a plurality of lubricant grooves 278 extending circumferentially about the track link bore longitudinal axis 250 that are axially spaced apart from each other.

Similarly, the outer bushing 256 may include a cylindrical configuration defining a second central thru-hole 280 that defines an outer bushing inner diameter 282, and the inner bushing 254 may define an inner bushing outer diameter 254. A ratio of the outer bushing inner diameter 282 to the inner bushing outer diameter 284 may range from 0.99 to 1.01. The outer bushing 256 may define an outer bushing radial thickness 286 ranging from 15.82 mm to 15.83 mm.

The first fluid seal assembly 260 may take the form of any seal assembly known or that will be devised in the art. For the first fluid seal assembly 260 shown in FIG. 4, the first fluid seal assembly 260 may comprise a thrust ring 288, a flexible or resilient load ring 290, a rigid backup member 292, and a sealing member 294. The thrust ring 288 is in contact with the second track link 226 and the outer bushing 256, helping to prevent the first fluid seal assembly 260 from being crushed. The resilient load ring 290 is in compression, providing the desired sealing force on the rigid backup member 292 and the sealing member 294. The rigid backup member 290 helps to provide enough rigidity so enough sealing force is produced. The sealing member 294 is designed to prevent the loss of lubrication by impinging on the outer bushing 256 in a fluid tight manner while still allowing the outer bushing 256 to rotate.

Looking now at FIGS. 1 thru 3, it can be understood that the track chain assembly 300 comprises a plurality of track hinge joints 200 according to the various embodiments discussed herein that are similarly or identically configured to each other.

As best understood with reference to FIG. 3, the track chain assembly 300 may define a midplane 302 disposed along the track pin bore longitudinal axis 250 and the track chain assembly 300 may further comprise a third track link 304 that is symmetrical with the first track link 202 about the midplane 302. A fourth track link 306 that is symmetrical with the second track link 226 about the midplane 302 may also be provided. Also, a second outer fluid seal assembly 310 that is symmetrical with the first outer fluid seal assembly 308 about the midplane 302 may be provided. Similarly, the inner bushing 254 may be symmetrical about the midplane 302, and the outer bushing 256 may be symmetrical about the midplane 302. Other configurations are possible such as those where various components are not symmetrical.

The track pin 252 may define a central lubrication bore 312 and a first cross-bore 314 extending radially from the central lubrication bore 312 to the first gap 316 located between the inner bushing 254 and the track pin 252. A second cross-bore 318 may be provided to communicate the lubricant to the second gap 320 located between the outer bushing 256 and the inner bushing 254. Alternatively, the second cross-bore 318 may be omitted and lubricant such as grease may be placed in the lubricant grooves 278 on the outside of the inner bushing 254 during assembly before the outer bushing 256 is slid over the inner bushing 254. Though not shown in FIG. 3, a retainer member may be held via swaging in the slot 322 disposed between the first track link 202 and the track pin 252 to help prevent the track pin 252 from walking. A similar arrangement may be used between the other end of the track pin 252 and the third track link 304.

The various components of the track chain assembly 300 and track hinge joint 200 may be manufactured using any suitable manufacturing process or material. The track links may be forged, cast, or machined using steel, cast iron, steel-cast iron, etc. Chemical compatibility with the lubricant such as oil or grease may be taken into account when selecting the materials of the components of the seal assemblies.

INDUSTRIAL APPLICABILITY

In practice, a track chain assembly, a track hinge joint (or subassembly thereof) and/or a machine using a track chain assembly or a track hinge joint (or subassembly thereof) according to any embodiment described herein may be sold, bought, manufactured or otherwise obtained in an OEM or after-market context.

For example, track chain assemblies already in the field may be retrofitted with an outer bushing, and outer fluid seal assemblies once the necessary bores have been machined into the inside of the inner track links, etc.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A track hinge joint comprising:
   a first track link including
      a first body defining a top surface, a bottom surface, a first side surface and a second side surface defining a thickness therebetween, a proximate end and a distal end, and a length therebetween;
      the first body defines a first bore with a first diameter disposed adjacent the proximate end and a second bore with a second diameter disposed adjacent the distal end, the first diameter being larger than the second diameter;
   a second track link including
      a second body defining a top surface, a bottom surface, a first side surface and a second side surface defining a thickness therebetween, a proximate end and a distal end, and a length therebetween;
      the second body defines a third bore with a third diameter disposed adjacent the proximate end and a fourth bore with a fourth diameter disposed adjacent the distal end, the third diameter being larger than the fourth diameter;
   wherein the third bore is aligned with the second bore, defining a common track link bore longitudinal axis;
   a track pin disposed in the second bore;
   an inner bushing that is disposed in the third bore that is rotatable relative to the track pin;
   an outer bushing that is disposed about the inner bushing that is rotatable relative to the inner bushing;
   wherein the outer bushing defines an outer bushing end face disposed along the track link bore longitudinal axis proximate the second track link;
   a first fluid seal assembly contacting the outer bushing end face and the second track link; and
   the first track link defines an inner seal groove concentric about the track link bore longitudinal axis, the inner bushing defines an inner bushing end face disposed along the track link bore longitudinal axis, and the track hinge joint further comprises a second fluid seal assembly disposed in the inner seal groove that contacts the inner bushing end face.

2. The track hinge joint of claim 1 wherein the second track link defines an outer seal groove concentric about the track link bore longitudinal axis and the first fluid seal assembly is disposed in the outer seal groove.

3. The track hinge joint of claim 1 wherein the inner bushing is press fit into the third bore of the second track link such that the inner bushing is fixed relative to the second track link.

4. The track hinge joint of claim 1 wherein the track pin is press fit into the second bore of the first track link such that the track pin is fixed relative to the first track link.

5. The track hinge joint of claim 1 wherein the inner bushing includes a cylindrical annular configuration defining a first central thru-hole that defines an inner bushing inner diameter, the track pin includes a cylindrical configuration that defines a track pin outer diameter, and a ratio of the inner bushing inner diameter to the track pin outer diameter ranges from 1.00 to 1.02.

6. The track hinge joint of claim 5 wherein the inner bushing defines a radial direction, a circumferential direction, and an inner bushing radial thickness ranging from 12.83 mm to 12.84 mm, the inner bushing further defining a plurality of lubricant grooves extending circumferentially about the track link bore longitudinal axis that are axially spaced apart from each other.

7. The track hinge joint of claim 5 wherein the outer bushing includes a cylindrical configuration defining a second central thru-hole that defines an outer bushing inner diameter, and the inner bushing defines an inner bushing outer diameter, and a ratio of the outer bushing inner diameter to the inner bushing outer diameter ranging from 1.00 to 1.02.

8. The track hinge joint of claim 7 wherein the outer bushing defines an outer bushing radial thickness ranging from 15.82 mm to 15.83 mm.

9. A track hinge joint comprising:
   a first track link including
      a first body defining a top surface, a bottom surface, a first side surface and a second side surface defining a thickness therebetween, a proximate end and a distal end, and a length therebetween;
      the first body defines a first bore with a first diameter disposed adjacent the proximate end and a second bore with a second diameter disposed adjacent the distal end, the first diameter being larger than the second diameter;
   a second track link including
      a second body defining a top surface, a bottom surface, a first side surface and a second side surface defining a thickness therebetween, a proximate end and a distal end, and a length therebetween;
      the second body defines a third bore with a third diameter disposed adjacent the proximate end and a fourth bore with a fourth diameter disposed adjacent the distal end, the third diameter being larger than the fourth diameter;
   wherein the third bore is aligned with the second bore, defining a common track link bore longitudinal axis;
   a track pin disposed in the second bore;
   an inner bushing that is disposed in the third bore that is rotatable relative to the track pin;
   an outer bushing that is disposed about the inner bushing that is rotatable relative to the inner bushing;
   wherein the inner bushing includes a cylindrical annular configuration, and defines an inner bushing end face disposed along the track link bore longitudinal axis that lacks a circumferential step at the inner bushing end face, defining a first central thru-hole that defines an inner bushing inner diameter, the track pin includes a cylindrical configuration that defines a track pin outer diameter, and a ratio of the inner bushing inner diameter to the track pin outer diameter ranges from 1.00 to 1.02, and the first track link defines an inner seal groove concentric about the track link bore longitudinal axis, and the track hinge joint further comprises a second fluid seal assembly disposed in the inner seal groove that contacts the inner bushing end face.

10. The track hinge joint of claim 9 wherein the outer bushing includes a cylindrical configuration defining a second central thru-hole that defines an outer bushing inner diameter, and the inner bushing defines an inner bushing outer diameter, and a ratio of the outer bushing inner diameter to the inner bushing outer diameter ranging from 0.99 to 1.01.

11. The track hinge joint of claim 9 wherein the inner bushing defines a radial direction, a circumferential direction, and an inner bushing radial thickness ranging from 12.83 mm to 12.84 mm, the inner bushing further defining a plurality of lubricant grooves extending circumferentially about the track link bore longitudinal axis that are axially spaced apart from each other.

12. The track hinge joint of claim 10 wherein the outer bushing defines an outer bushing radial thickness ranging from 15.82 mm to 15.83 mm.

13. The track hinge joint of claim 9 wherein the outer bushing defines an outer bushing end face disposed along the track link bore longitudinal axis proximate the second track link, and the track hinge joint further comprises a first fluid seal assembly contacting the outer bushing end face and the second track link.

14. The track hinge joint of claim 13 wherein the second track link defines an outer seal groove concentric about the track link bore longitudinal axis and the first fluid seal assembly is disposed in the outer seal groove.

15. The track hinge joint of claim 9 wherein the inner bushing is press fit into the third bore of the second track link such that the inner bushing is fixed relative to the second track link.

16. The track hinge joint of claim 9 wherein the track pin is press fit into the second bore of the first track link such that the track pin is fixed relative to the first track link.

17. A track chain assembly comprising:
a plurality of track hinge joints, each track hinge joint including
a first track link including
a first body defining a top surface, a bottom surface, a first side surface and a second side surface defining a thickness therebetween, a proximate end and a distal end, and a length therebetween;
the first body defines a first bore with a first diameter disposed adjacent the proximate end and a second bore with a second diameter disposed adjacent the distal end, the first diameter being larger than the second diameter;
a second track link including
a second body defining a top surface, a bottom surface, a first side surface and a second side surface defining a thickness therebetween, a proximate end and a distal end, and a length therebetween;
the second body defines a third bore with a third diameter disposed adjacent the proximate end and a fourth bore with a fourth diameter disposed adjacent the distal end, the third diameter being larger than the fourth diameter;
wherein the third bore is aligned with the second bore, defining a common track link bore longitudinal axis;
a track pin disposed in the second bore;
an inner bushing that is disposed in the third bore that is rotatable relative to the track pin;
an outer bushing that is disposed about the inner bushing that is rotatable relative to the inner bushing;
wherein the outer bushing defines an outer bushing end face disposed along the track link bore longitudinal axis proximate the second track link;
a first outer fluid seal assembly contacting the outer bushing end face and the second track link; and
the first track link defines an inner seal groove concentric about the track link bore longitudinal axis, the inner bushing defines an inner bushing end face disposed along the track link bore longitudinal axis, and the track hinge joint further comprises a second fluid seal assembly disposed in the inner seal groove that contacts the inner bushing end face.

18. The track chain assembly of claim 17 wherein the inner bushing end face lacks a step and the outer bushing end face lacks a step.

* * * * *